(12) United States Patent
Lee et al.

(10) Patent No.: US 12,133,177 B2
(45) Date of Patent: Oct. 29, 2024

(54) ELECTRONIC DEVICE AND METHOD FOR CONTROLLING TRANSMISSION POWER THEREOF

(71) Applicant: Samsung Electronics Co., Ltd., Suwon-si (KR)

(72) Inventors: Seokwoo Lee, Suwon-si (KR); Hokyung Kang, Suwon-si (KR); Yundong Kim, Suwon-si (KR); Bowoong Seo, Suwon-si (KR); Hyunchul Oh, Suwon-si (KR); Hyunsuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/497,722

(22) Filed: Oct. 8, 2021

(65) Prior Publication Data

US 2022/0030524 A1 Jan. 27, 2022

Related U.S. Application Data

(63) Continuation of application No. 16/845,596, filed on Apr. 10, 2020, now Pat. No. 11,147,026.

(30) Foreign Application Priority Data

Apr. 11, 2019 (KR) .................. 10-2019-0042624

(51) Int. Cl.
*H04W 52/28* (2009.01)
*H04M 1/02* (2006.01)

(52) U.S. Cl.
CPC ......... *H04W 52/28* (2013.01); *H04M 1/0214* (2013.01)

(58) Field of Classification Search
CPC . H04W 52/28; H04M 1/0268; H04M 1/0214; H04M 2250/12
See application file for complete search history.

(56) References Cited

U.S. PATENT DOCUMENTS

| 2010/0117975 | A1 | 5/2010 | Cho |
| 2012/0077538 | A1* | 3/2012 | Yun ........................ H04W 52/52 455/522 |

(Continued)

FOREIGN PATENT DOCUMENTS

| CN | 107800455 A | 3/2018 |
| CN | 108370084 A | 8/2018 |

(Continued)

OTHER PUBLICATIONS

Communication pursuant to Article 94(3) EPC dated May 30, 2022, in connection with European Application No. 20169052.6, 6 pages.

(Continued)

*Primary Examiner* — Keith Ferguson

(57) ABSTRACT

An electronic device is provided. The electronic device includes: a foldable housing comprising a hinge structure, and a first and a second housing structures connected to the hinge structure; a flexible display, a wireless communication circuit disposed inside the foldable housing; a grip sensor disposed in the foldable housing; at least one sensor disposed inside the foldable housing; a processor disposed inside the first housing structure or the second housing structure and operatively connected to the flexible display, the wireless communication circuit, the grip sensor, and the at least one sensor; and a memory, operatively connected to the processor, storing instructions that cause the processor to: measure an angle between the first and the third surface and/or an angle between the second and the fourth surface; detect a distance between the foldable housing and an (Continued)

external object; and control transmission power of the wireless communication circuit.

3 Claims, 7 Drawing Sheets

(56) References Cited

U.S. PATENT DOCUMENTS

| | | | |
|---|---|---|---|
| 2014/0043259 A1 | 2/2014 | Park | |
| 2014/0055933 A1* | 2/2014 | Waki | H05K 7/10 361/679.01 |
| 2014/0210757 A1 | 7/2014 | Woo et al. | |
| 2014/0274179 A1 | 9/2014 | Zhu et al. | |
| 2014/0306553 A1 | 10/2014 | Lee | |
| 2014/0357313 A1 | 12/2014 | Mercer et al. | |
| 2015/0296460 A1* | 10/2015 | Lee | H04W 52/04 455/522 |
| 2016/0098053 A1 | 4/2016 | Khawand et al. | |
| 2016/0299010 A1* | 10/2016 | Park | G06F 3/041 |
| 2016/0334836 A1* | 11/2016 | Hong | G06F 1/1681 |
| 2017/0052566 A1 | 2/2017 | Ka et al. | |
| 2017/0075640 A1 | 3/2017 | Chun et al. | |
| 2017/0192478 A1 | 7/2017 | Mercer et al. | |
| 2017/0365229 A1 | 12/2017 | Kwa | |
| 2018/0062684 A1 | 3/2018 | Kim | |
| 2018/0316379 A1 | 11/2018 | Chang et al. | |
| 2019/0036563 A1 | 1/2019 | Koshy et al. | |
| 2019/0056844 A1 | 2/2019 | Kang et al. | |
| 2019/0132542 A1 | 5/2019 | Lai et al. | |
| 2019/0324499 A1* | 10/2019 | Miyamoto | G06F 1/1616 |

FOREIGN PATENT DOCUMENTS

| | | | | |
|---|---|---|---|---|
| JP | 2001-223514 A | | 8/2001 | |
| JP | 2006163459 A | * | 6/2006 | G06F 1/1616 |
| JP | 2017033116 A | | 2/2017 | |
| KR | 10-2014-0020128 A | | 2/2014 | |
| KR | 10-2017-0031525 A | | 3/2017 | |
| KR | 10-2018-0005421 A | | 1/2018 | |
| KR | 10-2020-0072190 A | | 6/2020 | |
| TW | 1609294 B | * | 12/2017 | H04W 52/28 |
| WO | 2017/043936 A1 | | 3/2017 | |

OTHER PUBLICATIONS

International Search Report dated Jul. 24, 2020 in connection with International Patent Application No. PCT/KR2020/004848, 3 pages.
European Search Report dated Sep. 8, 2020 in connection with European Patent Application No. 20169052, 8 pages.
Written Opinion of the International Searching Authority dated Jul. 24, 2020 in connection with International Patent Application No. PCT/KR2020/004848, 6 pages.
Communication pursuant to Article 94(3) EPC dated Mar. 27, 2023, in connection with European Application No. 20169052.6, 4 pages.
Notification of the First Office Action dated Jan. 20, 2023, in connection with Chinese Application No. 202010278849.0, 18 pages.
Notice of Preliminary Rejection dated Feb. 14, 2023, in connection with Korean Application No. 10-2019-0042624, 15 pages.
Notice of Patent Grant dated Aug. 23, 2023, in connection with Korean Patent Application No. 10-2019-0042624, 4 pages.
Notification of the Second Office Action dated Sep. 20, 2023, in connection with Chinese Patent Application No. 202010278849.0, 16 pages.
Rejection Decision dated Jan. 29, 2024, in connection with Chinese Patent Application No. 202010278849.0, 16 pages.
Examination Report dated Mar. 2, 2024, in connection with Indian Patent Application No. 202117050734, 7 pages.
European Search Report dated Jul. 15, 2024, in connection with European Patent Application No. 24175416.7, 10 pages.

* cited by examiner

ELECTRONIC DEVICE AND METHOD FOR CONTROLLING TRANSMISSION POWER THEREOF

CROSS-REFERENCE TO RELATED APPLICATIONS

This application is a continuation of U.S. patent application Ser. No. 16/845,596 filed on Apr. 10, 2020, which is based on and claims priority under 35 U.S.C. 119 to Korean Patent Application No. 10-2019-0042624 filed on Apr. 11, 2019, in the Korean Intellectual Property Office, the disclosures of which are herein incorporated by reference in their entirety.

BACKGROUND

1. Field

The disclosure relates to an electronic device and a method for controlling transmission power thereof.

2. Description of Related Art

Electronic devices (e.g., mobile terminals, smartphones, or wearable devices) may provide wireless communication (e.g., Bluetooth, Wi-Fi, or near field communication (NFC)) functions using electric waves.

Electronic devices may generate electric waves that are harmful to human bodies during wireless communication. Accordingly, the electronic devices should satisfy the rules for electromagnetic waves on a specific absorption rate (SAR) for electromagnetic waves of a human body. However, the rules for electromagnetic waves may be different according to the types of the electronic devices. For example, the rules of electromagnetic waves may be differently defined for an electronic device of a phone type, an electronic device of a phablet type, an electronic device of a tablet type, or an electronic device of a laptop type. The electronic devices may be generally classified into a phone, a phablet, a tablet, or a laptop according to the sizes of the displays.

The above information is presented as background information only to assist with an understanding of the disclosure. No determination has been made, and no assertion is made, as to whether any of the above might be applicable as prior art with regard to the disclosure.

SUMMARY

In recent years, electronic devices including flexible display have been developed. For example, foldable electronic devices or rollable electronic devices have been developed. A size of the display of the foldable electronic devices or the rollable electronic devices may vary according to a situation, and the type of the electronic device may become different according to the varied size of the display. Accordingly, there is a need to control a transmission power of the electronic devices including the flexible display such that the SAR rule that is suitable for the changes in the sizes of the displays is satisfied.

The disclosure provides an electronic device that can control transmission power of a wireless communication circuit such that an SAR rule (e.g., a specific absorption rate for electromagnetic waves of a human body) is satisfied in correspondence (response) to a change in the size or the form of a display.

The disclosure also provides an electronic device that can control transmission power of a wireless communication circuit such that an SAR rule according to an approach degree of an external object (e.g., a user) is satisfied.

In accordance with an aspect of the disclosure, an electronic device may include: a foldable housing including: a hinge structure; a first housing structure connected to the hinge structure, and including a first surface facing a first direction and a second surface facing a second direction that is opposite to the first direction; and a second housing structure connected to the hinge structure, including a third surface facing a third direction and a fourth surface facing a fourth direction that is opposite to the third direction, and being folded with the first housing structure while the hinge structure is taken as an axis; a flexible display extending from the first surface to the third surface and defining the first surface and the third surface; a wireless communication circuit disposed inside the foldable housing; a grip sensor disposed in the foldable housing; at least one sensor disposed inside the foldable housing and configured to detect a folding state of the foldable housing; a processor disposed inside the first housing structure or the second housing structure and operatively connected to the flexible display, the wireless communication circuit, the grip sensor, and the at least one sensor; and a memory operatively connected to the processor, wherein the memory stores instructions that, when executed, cause the processor to: measure an angle between the first surface and the third surface and/or an angle between the second surface and the fourth surface by using the at least one sensor; detect a distance between the foldable housing and an external object by using the grip sensor; and control transmission power of the wireless communication circuit based at least in part on the measured angle and the detected distance.

In accordance with another aspect of the disclosure, an electronic device may include: a housing; a flexible display; a support structure configured to roll the flexible display; a wireless communication circuit disposed inside the housing; a grip sensor; at least one sensor configured to detect a unfolding degree of the flexible display; a processor disposed inside the housing, and operatively connected to the flexible display, the wireless communication circuit, the grip sensor, and the at least one sensor; and a memory operatively connected to the processor, wherein the memory stores instructions that, when executed, cause the processor to: determine the unfolding degree of the flexible display by using the at least one sensor; detect an approach distance of an external object from the electronic device by using the grip sensor; and control transmission power of the wireless communication circuit based at least in part on the unfolding degree and the approach distance.

In accordance with another aspect of the disclosure, a method for controlling transmission power of an electronic device may include: determining an effective size of an exposed area of a flexible display; determining a type of the electronic device, at least on the basis of the determined effective size; detecting a distance between the electronic device and an external object; and controlling transmission power of the wireless communication circuit based at least in part on the determined type of the electronic device and the detected distance.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
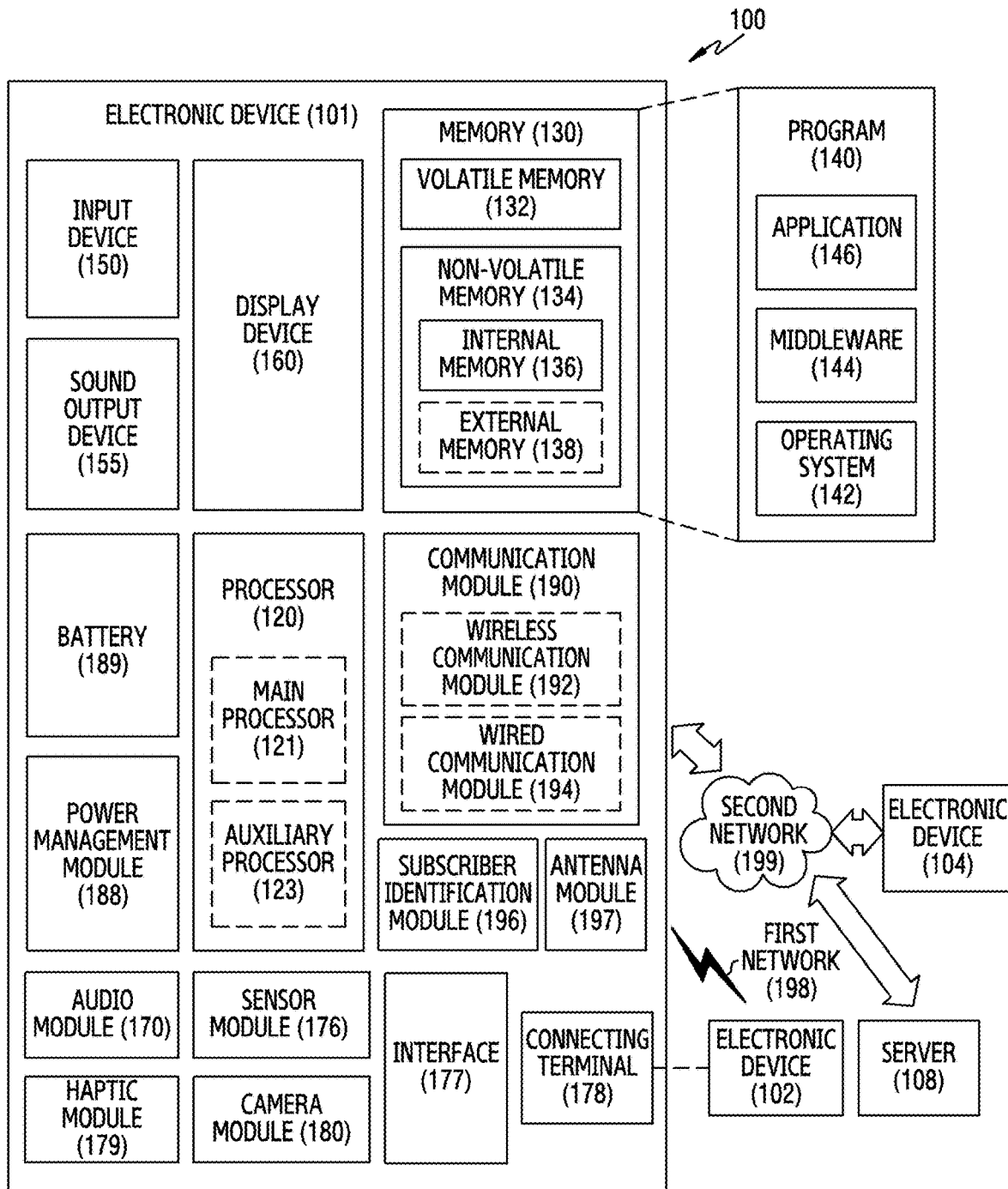
FIG. 1 illustrates an electronic device in a network environment according to an embodiment of the disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments will be described with reference to the accompanying drawings. Although this document has specific embodiments illustrated in the drawings and described in detail with reference thereto, the same is not for the purpose of limiting various embodiments to specific forms. For example, it would be obvious to a person skilled in the art to which the disclosure pertains that various embodiments can be variously modified.

FIG. 1 illustrates an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or may be used to access an external memory 138.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module (SIM) 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 may perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
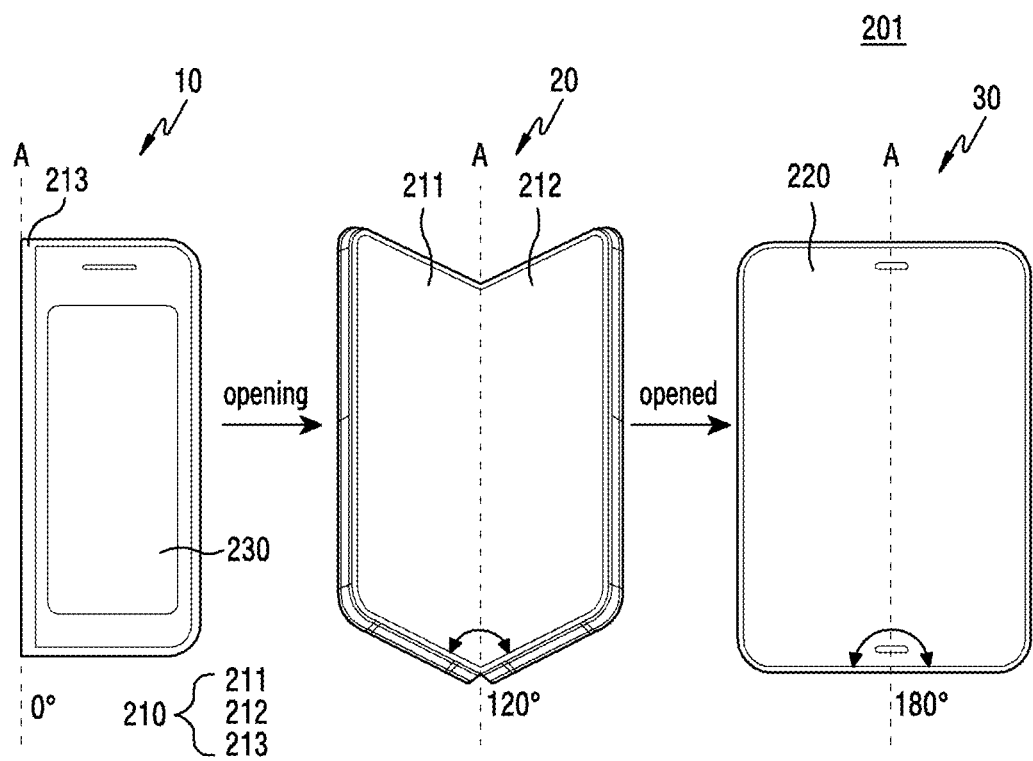
FIG. 2A illustrates a foldable electronic device according to an embodiment of the disclosure.

FIG. 2A illustrates a foldable electronic device according to an embodiment of the disclosure.

Referring to FIG. 2A, a foldable electronic device 201 (e.g., the electronic device 101) according to an embodiment of the disclosure may include a foldable housing 210, a flexible (or foldable) display 220, and a sub-display 230. In the disclosure, a surface, on which the flexible display 220 is disposed, is defined as a first surface or a front surface of the foldable electronic device 201. An opposite surface of the front surface is defined as a second surface or a rear surface of the foldable electronic device 201. A surface that surrounds a space between the front surface and the rear surface is defined as a third surface or a side surface of the foldable electronic device 201.

The foldable housing 210 may include a first housing structure 211, a second housing structure 212, and a hinge structure 213.

The first housing structure 211 may be connected to the second housing structure 212 through the hinge structure 213, and include a first surface facing a first direction and a second surface facing a second direction that is opposite to the first direction. The sub-display 230 may be located on the second surface of the first housing structure 211.

The second housing structure 212 may include a third surface connected to the first housing structure 211 through the hinge structure 213 and facing a third direction and a fourth surface facing a fourth direction that is opposite to the third direction. The third surface may refer to a front surface of the second housing structure 212, and the fourth surface may refer to a rear surface of the second housing structure 212.

The hinge structure 213 may be connected to the first housing structure 211 and the second housing structure 212, and may maintain the first housing structure 211 and the second housing structure 212 disposed on opposite sides of a folding axis (axis A) in a folding state, a flat state, or an intermediate state. The intermediate state may be a state, in which the first housing structure 211 and the second housing structure 212 define a certain angle.

The flexible display 220 may be disposed in a space defined by the foldable housing 210. For example, the flexible display 220 may be seated (or accommodate) in a recess defined by the first housing structure 211 and the second housing structure 212. At least a partial area of the flexible display 220 may be deformed to a flat surface or a curved surface. For example, the flexible display 220 may be folded with respect to the folding axis (axis A).

The sub-display 230 may be viewed through at least a portion of the second surface of the first housing structure 211. The sub-display 230 may or may not provide various screens in the folding state of the foldable electronic device 201.

In the foldable electronic device 201, various components may be disposed inside or outside the foldable housing 210. For example, the foldable electronic device 201 may include an illumination sensor, a camera, or an approach detecting interface (e.g., a grip sensor) that detects an approach of an external object, on the outside thereof. The foldable electronic device 201 may include a wireless communication circuit, a type detecting interface including at least one sensor (e.g., an angle sensor, a motion sensor, a Hall sensor, and a counter sensor) that detects a folding state of the foldable housing 210, a processor, a memory, and/or a battery, in the interior thereof.

The above-described foldable electronic device 201 may control power transmission of the wireless communication circuit according to an international specific absorption rate (SAR) standard. The international SAR standard may have different rules according to the type of the electronic device. For example, as in Table 1, the international SAR standard classifies the electronic device into a phone type, a phablet type, a mini-tablet type, a tablet type, or a laptop type with reference to the size of the display, and applies different rules according to the types.

TABLE 1

International SAR standard classification

| Type | Category | Spacing distance | 10 g/1 g | Reference standard (W/Kg) |
|---|---|---|---|---|
| Phone | Body | 15 mm (Hotspot not supported) | 1 g | 1.6 |
| | Body | 10 mm (Hotspot supported) | 1 g | 1.6 |
| Phablet | Arm | 0 mm | 10 g | 4.0 |
| | Body | 15 mm (Hotspot not supported) | 1 g | 1.6 |
| | Body | 10 mm (Hotspot supported) | 1 g | 1.6 |
| Mini-tablet | Body | 5 mm | 1 g | 1.6 |
| Tablet | Body | 0 mm | 1 g | 1.6 |
| Laptop | Arm | 0 mm | 10 g | 4.0 |
| | Body | 25 mm | 1 g | 1.6 |

Referring to Table 1, the international SAR standard may classify the electronic device into a phone type, a phablet type, a mini-tablet type, a tablet type, or a laptop type according to the size of the display. For example, the electronic device may be classified as a phone when the length of the diagonal line of the display is less than a first reference value (e.g., 15 cm), may be classified as a phablet when the length of the diagonal line of the display is not less than the first reference value (e.g., 15 cm) and less than a second reference value (e.g., 20 cm), and a voice communication is possible, may be classified as a mini-tablet when the length of the diagonal line of the display is not less than the first reference value (e.g., 15 cm) and less than the second reference value (e.g., 20 cm) and a voice communication is impossible, may be classified as a tablet when the length of the diagonal line of the display is not less than the second reference value, and may be classified as a laptop when the electronic device is docked with a keyboard device or a keyboard is displayed in an area of the electronic device when being folded.

The international SAR standard designates a maximum value of an SAR value measured in a state in which the electronic is spaced apart from a specific portion (e.g., an arm or the body) of a user by a specific spacing distance. For example, it can be seen that for the SAR value measured when a wireless signal is transmitted while the electronic body is spaced apart from the body of the user by 10 mm, when the electronic device is a phone type and supports Hotspot, an average value may be 1.6 W/Kg per 1 g of a human body. Further, it can be seen that for the SAR value measured when a wireless signal is transmitted while an arm of the user and a phablet contact each other (are spaced apart from each other by 0 mm) when the electronic device is a phablet type and supports Hotspot, an average value may be 4.0 W/Kg per 10 g of a human body. Here, a detailed description of another example may be omitted for convenience of description.

The foldable electronic device 201 according to an embodiment of the disclosure, as illustrated in FIG. 2A, may be deformed into a folding state, an intermediate state, and an unfolding state, and the size of the display may vary according to the states. The foldable electronic device 201 may determine the type of the electronic device as the size of the display changes, and may control transmission power of the wireless communication circuit to satisfy the SAR rule corresponding to the determined type.

The foldable electronic device 201 (e.g., the processor) may measure an angle between the first surface and the third surface and/or an angle between the second surface and the fourth surface by using at least one sensor (e.g., an angle sensor or a motion sensor disposed in the foldable housing 210, and may determine the type of the electronic device, to which the SAR standard is to be applied, on the basis of the measured angle. For example, the foldable electronic device 201 may measure the angle between the first surface and the third surface (or between the second surface and the fourth surface) through an angle sensor connected to the hinge structure 213. Further, the foldable electronic device 201 may measure an angle between the first surface and the third surface (or between the second surface and the fourth surface) through a first motion sensor disposed in the first housing structure 211 and a second motion sensor disposed in the second housing structure 212. According to some embodiments, an electronic device 201 may measure the angle between the first surface and the third surface (or between the second surface and the fourth surface) through a counter sensor that detects a saw-tooth motion of the hinge structure (e.g., the hinge structure 213). According to some embodiments, the foldable electronic device 201 may measure an angle between the first surface of the first housing structure 211 and the second surface of the second housing structure 212 through at least one Hall sensor that detects a magnetic force. For example, the foldable electronic device 201 may measure the angle between the first surface and the second surface on the basis of the magnetic force detected by the Hall sensor.

The foldable electronic device 201 may be determined as a phone type when the measured angle is in a first range (e.g., the angle between the first surface and the third surface is from "0 degrees to 45 degrees" or the angle between the second surface and the fourth surface is from "315 degrees to 360 degrees") as denoted by reference numeral 10, may be determined as a phablet type when the measured angle is in a second range (e.g., the angle between the first surface and the third surface is from "45 degrees to 135 degrees" or the angle between the second surface and the fourth surface is from "225 degrees to 315 degrees") as denoted by reference numeral 20, and may be determined as a tablet type (or a mini-tablet type) when the measured angle is in a third range (e.g., the angle between the first surface and the third surface is from "135 degrees to 180 degrees" or the angle between the second surface and the fourth surface is from "180 degrees to 225 degrees") as denoted by reference numeral 30.

According to some embodiments, the foldable electronic device 201 may be determined as a laptop type when the electronic device docked with a docking device including a keyboard and has a form that is similar to a notebook computer. Further, the foldable electronic device 201 may be determined as a laptop type when the electronic device is an intermediate state, in which the first housing structure 211 and the second housing structure 212 are folded to have a predetermined angle therebetween and a virtual keyboard is displayed in the first area or the second area of the display.

The foldable electronic device 201 may detect a distance between the foldable housing 210 and an external object (e.g., a human body) by using at least one sensor (e.g., a grip sensor) disposed in the foldable housing 210.

The foldable electronic device 201 may control transmission power of the wireless communication circuit at least partially on the basis of the determined type of the electronic device and the detected distance. For example, the foldable electronic device 201 may store a lookup table including a plurality of parameters related to the type, the distance, and the transmission power of the electronic device, in a memory in advance. The foldable electronic device 201 may select at least one parameter from the lookup table, at least partially on the basis of the determined type and the detected distance, and may control the transmission power of the wireless communication circuit such that the transmission power corresponds to the selected parameter.

According to some embodiments, the foldable electronic device 201 may control the transmission power of the wireless communication circuit at least partially on the basis of the measured angle and the detected distance. For example, the foldable electronic device 201 may store a lookup table including a plurality of parameters related to an angle, a distance, and transmission power in a memory in advance, may select at least one parameter corresponding to the measured angle and the detected distance from the lookup table, and may control the transmission power of the wireless communication circuit such that the transmission power corresponds to the selected parameter.

According to some embodiments, the foldable electronic device may be multi-folded with respect to a plurality of folding axes. For example, the foldable electronic device may include a first folding axis for folding/unfolding the first housing structure and the second housing structure, and a second folding axis for folding/unfolding the second housing structure and the third housing structure. The foldable electronic device may control the transmission power of the wireless communication circuit at least partially on the basis of the effective size of the display according to a folding/unfolding state of at least one of the first to third housing structures. For example, in the foldable electronic device, the effective sizes of the display may be different when the first housing structure and the second housing structure are unfolded and the third housing structure and the second housing structure are folded and when both of the first housing structure and the third housing structure are unfolded, and may control the transmission power of the wireless communication circuit on the basis of the effective size of the display.

Figure 2B:
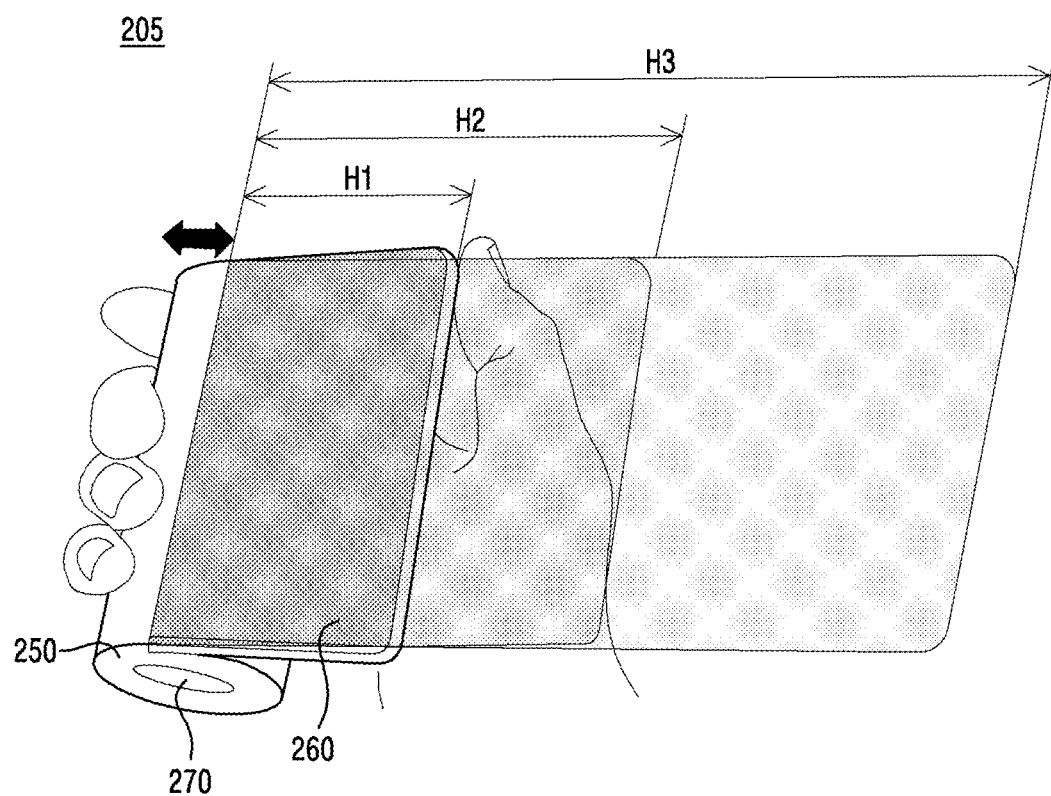
FIG. 2B illustrates a rollable electronic device according to an embodiment of the disclosure.

FIG. 2B illustrates a rollable electronic device according to an embodiment of the disclosure.

Referring to FIG. 2B, the rollable electronic device 205 (e.g., the electronic device 101) may include a housing 250, a flexible display 260, and a support structure (or a rollable module) 270 configured to roll the flexible display 260.

The housing 250 may have a cylindrical shape. This is because the flexible display 260 may be rolled to be round. However, the disclosure is not limited thereto, and the housing 250 may have a rectangular shape, and the flexible display 260 may be rolled to be round in the interior of the housing 250.

At least a portion of the flexible display 260 may be deformed. For example, the flexible display 260 may be located to be rolled in the interior of the housing 250, or may be exposed to the outside to be flat.

The support structure 270 may roll the flexible display 260. For example, the support structure 270 may be rotated counterclockwise such that the flexible display 260 is rolled in the interior of the housing 250. Further, the support structure 270 may be rotated clockwise such that the flexible display 260 is exposed to the outside. The support structure 270 may be rotated clockwise or counterclockwise by a force of a user or an actuator (e.g., a motor).

In the rollable electronic device 205, various components may be disposed inside or outside the housing 250. For example, the rollable electronic device 205 may include a button, a fingerprint sensor, an approach detecting module (e.g., a grip sensor) on the outside thereof. The rollable electronic device 205 may include a wireless communication circuit, a type detecting module including at least one sensor (e.g., an angle sensor, a motion sensor, a Hall sensor, and a counter sensor) that detects an unfolding degree of the flexible display 260, a processor, a memory, and/or a battery, in the interior thereof.

The rollable electronic device 205 may determine the type of the electronic device according to an unfolding degree (e.g., a transverse length) of the flexible display 260. For example, the electronic device may check a degree of rotation of the support structure 270 through at least one sensor, and may calculate the unfolding degree according to the degree of rotation. The rollable electronic device 205 (e.g., the processor) may determine the electronic device as a phone type when the unfolding degree H1 (e.g., the transverse length) of the flexible display 260 exposed to the outside is not more than (or less than) a first reference value (e.g., a transverse length when the diagonal length of the exposed flexible display 260 is 15 cm), may determine the electronic device as a phablet type when the unfolding degree H2 is more than (or not less than) the first reference value and is not more than (or less than) a second reference value (e.g., a transverse length when the diagonal length of the exposed flexible display 260 is 20 cm), and may determine the electronic device as a tablet type (or a mini-tablet type) when the unfolding degree H3 is more than (or not less than) the second reference value.

The rollable electronic device 205 may detect a distance between the housing 250 and an external object (e.g., a human body) by using at least one sensor (e.g., a grip sensor) disposed in the housing 250.

The rollable electronic device 205 may control the transmission power of the wireless communication circuit such that the transmission power satisfies the SAR rule corresponding to the determined type and the distance. For example, the rollable electronic device 205 may store a lookup table including a plurality of parameters related to the type, the distance, and the transmission power of the electronic device, in a memory. The rollable electronic device 205 may select at least one parameter from the lookup table, at least partially on the basis of the determined type and the detected distance, and may control the transmission power of the wireless communication circuit such that the transmission power corresponds to the selected parameter.

According to some embodiments, the rollable electronic device 205 may control the transmission power of the wireless communication circuit at least partially on the basis of the unfolding degree and the detected distance. For example, the rollable electronic device 205 may store a lookup table including a plurality of parameters related to an unfolding angle, a distance, and transmission power in a memory in advance, may select at least one parameter corresponding to the unfolding degree and the detected distance from the lookup table, and may control the transmission power of the wireless communication circuit such that the transmission power corresponds to the selected parameter.

Figure 3:
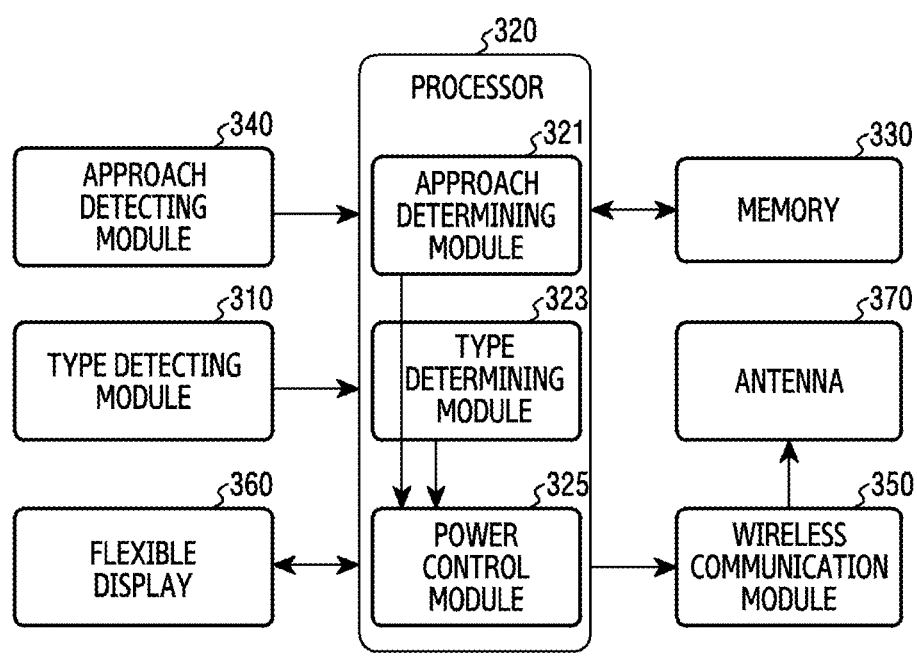
FIG. 3 illustrates a configuration of an electronic device according to an embodiment of the disclosure.

FIG. 3 illustrates a configuration of an electronic device according to an embodiment of the disclosure.

Referring to FIG. 3, an electronic device (e.g., the electronic device 101, the foldable electronic device 201, and the rollable electronic device (205) according to an embodiment of the disclosure may include a type detecting module 310, a processor 320, a memory 330, an approach detecting module 340, a wireless communication module 350, a flexible display 360, and an antenna 370.

At least a partial area of the flexible display 360 (e.g., the display 160, the flexible display 220, and the flexible display 260) may be deformed to a flat surface or a curved surface. For example, the flexible display 360 may be folded with respect to a folding axis (e.g., axis A of FIG. 1) or may be rolled on the support structure (e.g., the support structure 270).

The type detecting module 310 may detect a change in the size of the exposed area of the flexible display 360. For example, the type detecting module 310 may measure a state and/or a folding angle of a foldable housing (e.g., the foldable housing 210) by using at least one of a Hall sensor that detects a magnetic force, an angle sensor, a motion sensor, or a counter sensor that detects a saw-tooth motion of a hinge structure (e.g., the hinge structure 213). As another example, the type detecting module 310 may measure the unfolding degree of the flexible display 360 by using a sensor that detects the degree of rotation of the support structure.

The approach detecting module 340 may identify whether an external object (e.g., a human body) has approached the electronic device. The approach detecting module 340 may identify whether an external object approaches the electronic device or a distance from the external object by using at least one of a capacitive grip sensor, the capacity of which changes as a dielectric body approaches the grip sensor, an ultrasonic wave sensor, or an infrared ray sensor.

The memory 330 (e.g., the memory 130) may be located in the interior of the electronic device, and may be operatively (functionally) connected to the processor 320. The memory 330 may store various programs, and may store data generated while the various programs are executed or downloaded. The memory 330 may store various commands and/or instructions for operating the processor 320. The memory 330 may include at least one of an internal memory or an external memory.

According to various embodiments of the disclosure, the memory 330 may store a program that causes the processor 320 to control transmission power according to the type of the electronic device and a distance from an external object (hereinafter, an approach distance). The memory 330 may store a lookup table used for controlling the transmission power of the wireless communication module 350 at least partially on the basis of the type of the electronic device and the approach distance of the external object. The lookup table is a table for controlling the transmission power of the wireless communication module 350 according to various situations (environments) such that the international SAR standard of Table 1 is satisfied, and may include a plurality of parameters (transmission power parameters) related to the type of the electronic device, the approach distance, and the transmission power. For example, the lookup table may be stored as in Table 2.

TABLE 2

| | Lookup table | | |
|---|---|---|---|
| Type | Approach distance | | Transmission power parameter |
| Phone | More than first threshold value | | (1-1)-th transmission power |
| | Not more than first threshold value~ more than second threshold value | | (1-2)-th transmission power |
| | Not more than second threshold value | | (1-3)-th transmission power |
| Phablet | More than first threshold value | | (2-1)-th transmission power |
| | Not more than first threshold value~ more than second threshold value | | (2-2)-th transmission power |
| | Not more than second threshold value~ more than third threshold value | | (2-3)-th transmission power |
| | Not more than third threshold value | | (2-4)-th transmission power |
| Mini-tablet | More than first threshold value | | (3-1)-th transmission power |
| | Not more than first threshold value | | (3-2)-th transmission power |
| Tablet | More than first threshold value | | (4-1)-th transmission power |
| | Not more than first threshold value | | (4-2)-th transmission power |
| Laptop | First condition | — | (5-1)-th transmission power |
| | Second condition | More than first threshold value | (5-2)-th transmission power |
| | | Not more than first threshold value | (5-3)-th transmission power |

In Table 2, the first condition may refer to a case in which the distance between an antenna and a human body is a specific threshold value or more, and the second condition may refer to a case in which the distance between the antenna and the human body is less than the specific threshold value. Meanwhile, Table 2 is simply an example, and may be stored in conjunction with the angle of the foldable electronic device or the unfolding degree of the rollable electronic device and the approach distance and the transmission power parameter.

The processor 320 (e.g., the processor 120) may control an overall operation of the electronic device. For example, the processor 320 may be operatively connected to elements (e.g., the flexible display 360, the wireless communication module 350, the approach detecting module 340, and the type detecting module 310) of the electronic device to control the elements of the electronic device. The processor 320 may perform various functions by receiving a command or instructions from the memory 330 and controlling the elements according to the received command or instructions.

The processor 320 according to an embodiment of the disclosure may include an approach determining module 321, a type determining module 323, and a power control module 325. The approach determining module 321 may determine whether an external object has approached the electronic device and/or an approach distance on the basis of information (e.g., a sensor value corresponding to whether the external object has approached the electronic device and/or the approach distance) received from the approach detecting module 340, and may deliver the determination result to the power control module 325. The type determining module 323 may determine the type of the electronic device on the basis of information (e.g., the sensor value corresponding to the angle or the unfolding degree) received from the type detecting module 310, and may deliver the determination result to the power control module 325.

The power control module 325 may control the transmission power of the wireless communication module 350 on the basis of the information received from the approach determining module 321 and the type determining module 323. For example, the power control module 325 may select a parameter corresponding to the type and the distance from the lookup table, and may transmit the selected parameter to the wireless communication module 350.

The wireless communication module 350 (or the wireless communication circuit) (e.g., the communication module 190) may transmit and/or receive a wireless signal through the antenna 370. For example, the wireless communication module 350 may connect an external device and a communication channel. The wireless communication module 350 according to an embodiment of the disclosure may transmit a wireless signal through the antenna 370 with transmission power according to control of the processor 320 (e.g., the power control module 325).

The antenna 370 may be connected to the wireless communication module 350 to transmit or receive a wireless signal.

According to various example embodiments of the disclosure, an electronic device (e.g., the electronic device 101, the foldable electronic device 201) may comprise: a foldable housing (e.g., the foldable housing 210) comprising a hinge structure (e.g., the hinge structure 213), a first housing structure (e.g., the first housing structure 211) connected to the hinge structure, and comprising a first surface facing a first direction and a second surface facing a second direction that is opposite to the first direction, and a second housing structure (e.g., the second housing structure 212) connected to the hinge structure, comprising a third surface facing a third direction and a fourth surface facing a fourth direction that is opposite to the third direction, and foldable with the first housing structure while the hinge structure is taken as an axis; a flexible display (e.g., the display device 160, the flexible display 220, the flexible display 360) extending from the first surface to the third surface and defining the first surface and the third surface; a wireless communication circuit (e.g., the wireless communication module 192, the wireless communication module 350) disposed inside the foldable housing; a grip sensor (e.g., the sensor module 176, the approach detecting module 340) disposed in the foldable housing; at least one sensor (e.g., the sensor module 176, the type detecting module 310) disposed inside the foldable housing and configured to detect a folding state of the foldable housing; a processor (e.g., the processor 120, the processor 320) disposed inside the first housing structure or the second housing structure and operatively connected to the flexible display, the wireless communication circuit, the grip sensor, and the at least one sensor; and a memory (e.g., the memory 130, the memory 330) operatively connected to the processor, wherein the memory stores instructions that, when executed, cause the processor to: measure an angle between the first surface and the third surface and/or an angle between the second surface and the fourth surface by using the at least one sensor, detect a distance between the foldable housing and an external object by using the grip sensor, and control transmission power of the wireless communication circuit based at least in part on the measured angle and the detected distance.

According to various example embodiments, the instructions may cause the processor to: select at least one of a plurality of parameters used for controlling the transmission power based at least in part on the measured angle and the detected distance.

According to various example embodiments, the memory may store a lookup table comprising the plurality of parameters.

According to various example embodiments, the lookup table may comprise parameters related to the transmission power, a type of the electronic device according to the angle, and the distance.

According to various example embodiments, the type of the electronic device may comprise at least two of a phone type, a phablet type, a mini-tablet type, a tablet type, or a laptop type defined by an international specific absorption rate (SAR) standard.

According to various example embodiments, the at least one sensor may comprise an angle sensor connected to the hinge structure to measure the angle between the first surface and the third surface.

According to various example embodiments, the at least one sensor may comprise a first motion sensor disposed inside the first housing structure, and a second motion sensor disposed inside the second housing structure.

According to various example embodiments of the disclosure, an electronic device (e.g., the electronic device 101, the rollable electronic device 205) may comprise: a housing (e.g., the housing 205); a flexible display (e.g., the display device 160, the flexible display 260, the flexible display 360); a support structure (e.g., the support structure 270) configured to roll the flexible display; a wireless communication circuit (e.g., the wireless communication module 192, the wireless communication module 350) disposed inside the housing; a grip sensor (e.g., the sensor module 176, the approach detecting module 340); at least one sensor (e.g., the sensor module 176, the type detecting module 310) configured to detect a unfolding degree of the flexible display; a processor (e.g., the processor 120, the processor 320) disposed inside the housing, and operatively connected to the flexible display, the wireless communication circuit, the grip sensor, and the at least one sensor; and a memory (e.g., the memory 130, the memory 330) operatively connected to the processor. wherein the memory may store instructions that, when executed, cause the processor to: determine the unfolding degree of the flexible display by using the at least one sensor, detect an approach distance of an external object from the electronic device by using the grip sensor, and control transmission power of the wireless communication circuit based at least in part on the unfolding degree and the approach distance.

According to various example embodiments, the instructions may cause the processor to: select at least one of a plurality of parameters used for controlling the transmission power based at least in part on the unfolding degree and the approach distance.

According to various example embodiments, the memory may store a lookup table comprising the plurality of parameters.

According to various example embodiments, the lookup table may comprise parameters related to the transmission power, a type of the electronic device according to the unfolding degree, and the distance.

According to various example embodiments, the type of the electronic device may comprise at least two of a phone type, a phablet type, a mini-tablet type, a tablet type, or a laptop type defined by an international specific absorption rate (SAR) standard.

Figure 4:
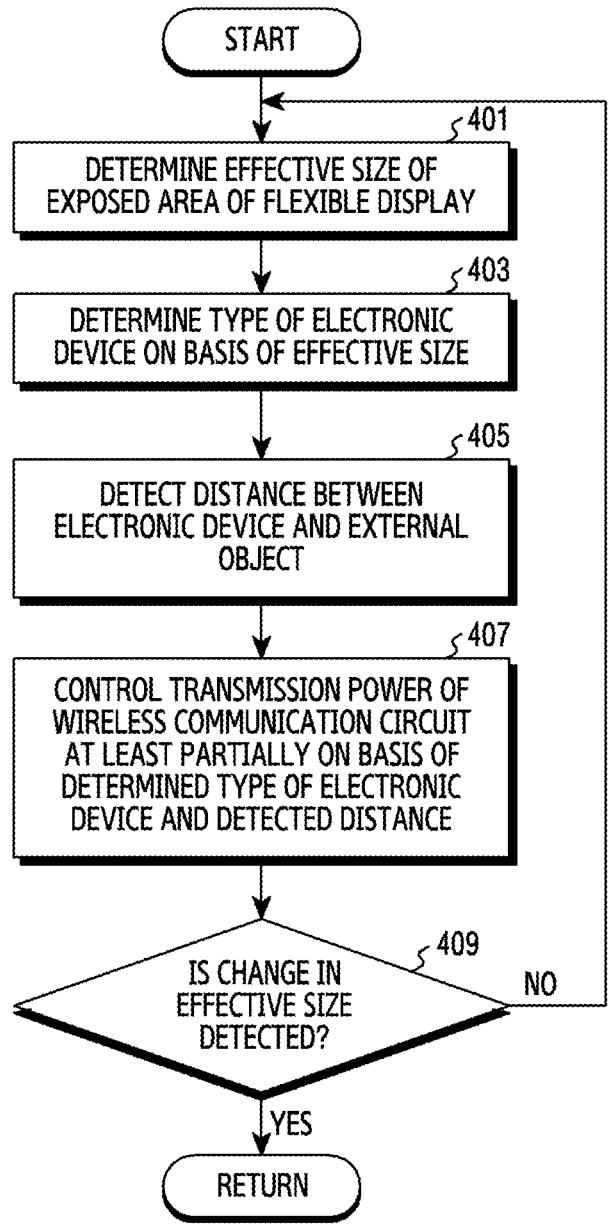
FIG. 4 illustrates a flowchart of a method for controlling transmission power of an electronic device according to an embodiment of the disclosure.

FIG. 4 illustrates a flowchart of a method for controlling transmission power of an electronic device according to an embodiment of the disclosure.

Referring to FIG. 4, an electronic device (e.g., the processor (e.g., the processor 120 and the processor 320) of the electronic device 101, the foldable electronic device 201, the rollable electronic device 205), in operation 401, may determine the effective size of an exposed area of the flexible display (e.g., the display device 160, the flexible display 220, the flexible display 260, and the flexible display 360). For example, the processor may measure the angle of the foldable housing (e.g., the foldable housing 210) of the electronic device by using the Hall sensor, the counter sensor, the angle sensor, the first motion sensor disposed in the first housing structure, and the second motion sensor disposed in the second housing structure, and may determine the effective size on the basis of the measured angle. The angle may be an angle between the front surfaces (e.g., between the first surface and the third surface) or an angle between the rear surfaces (e.g., between the second surface and the fourth surface) of the first housing structure (e.g., the first housing structure 211) and the second housing structure (e.g., the second housing structure 212). According to some embodiments, the processor may measure (determine) the effective size according to the unfolding degree of the flexible display that may be rolled on the support structure (e.g., the support structure 270).

The processor (e.g., the type determining module 323) according to an embodiment of the disclosure, in operation 403, may determine the type of the electronic device on the basis of the effective size of the flexible display. For example, the processor, as described with reference to FIGS. 2A and 2B, may determine the type of the electronic device on the basis of the effective size. The type of the electronic device may include a phone type, a phablet type, a mini-tablet type, a tablet type, or a laptop type defined by the international SAR standard.

The processor (e.g., the approach determining module 321) according to an embodiment of the disclosure, in operation 405, may detect a distance between the electronic device and an external object (e.g., a human body). For example, the processor may detect whether a human body has approached the electronic device and a distance from the human body by using the approach detecting module (e.g., the approach detecting module 340). The approach detecting module may include at least one of a grip sensor, an ultrasonic wave sensor, and an infrared ray sensor.

The processor (e.g., the power control module 325) according to an embodiment of the disclosure, in operation 407, may control the transmission power of the wireless communication circuit (e.g., the wireless communication module 192 and the wireless communication module 350) at least partially on the basis of the determined type of the electronic device and the detected distance. For example, the processor may select at least one of a plurality of parameters included in the lookup table stored in the memory (e.g., the memory 130 and the memory 330) at least partially on the basis of the determined type of the electronic device and the detected distance, and may control the wireless communication circuit such that a wireless signal is transmitted with the transmission power corresponding to the selected parameter. The lookup table may include parameters related to the type of the electronic device, the distance, and the transmission power.

The processor according to an embodiment of the disclosure, in operation 409, may identify whether the change in the effective size of the flexible display is detected. When the change in the effective size is not detected in the identification result of operation 409, the processor may return to operation 405 and repeat the above-described operations.

Meanwhile, when the change in the effective size is detected in the identification result of operation 409, the processor may return to operation 401 and repeat the above-described operations.

According to some embodiments, operations 401 to 409, which have been described above, may be performed when a wireless communication is connected or a wireless communication function is enabled. For example, the above-described method may further include a communication connecting operation before operation 401.

Figure 5:
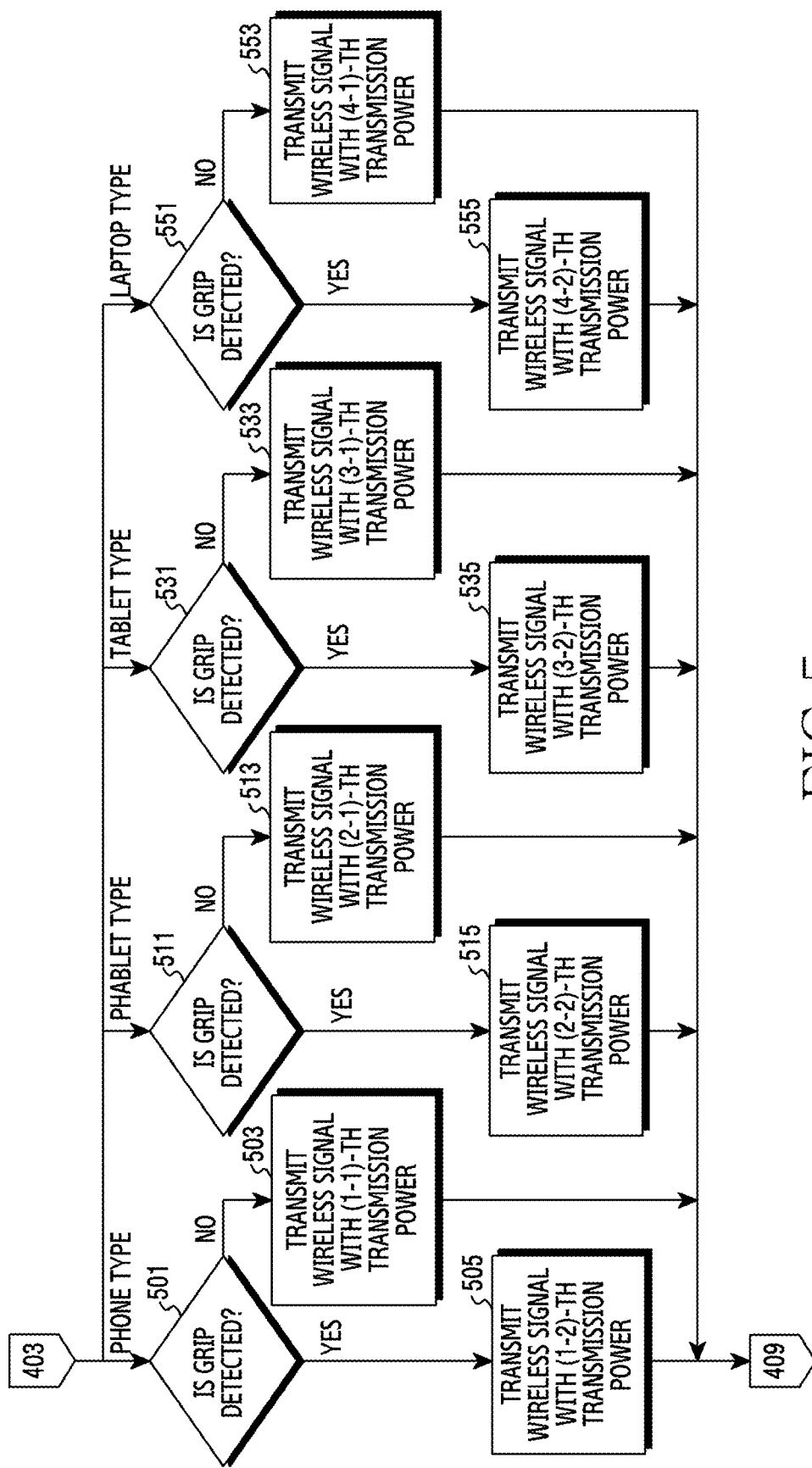
FIG. 5 illustrates a flowchart of a method for controlling transmission power of an electronic device according to a gripping state according to an embodiment of the disclosure.

FIG. 5 illustrates a flowchart of a method for controlling transmission power of an electronic device according to a gripping state according to an embodiment of the disclosure.

Referring to FIG. 5, when the type of the electronic device is a phone type in the identification result of operation 403, the processor (e.g., the processor 120 and the processor 320), in operation 501, may identify whether a grip is detected. For example, the processor may identify whether an external object (e.g., a human body) contacts (or is located within a predetermined distance from) a partial area of the electronic device. When a grip is not detected in the identification result of operation 501, the processor, in operation 503, may control a wireless communication circuit such that a wireless signal is transmitted with a (1-1)-th transmission power. The (1-1)-th transmission power may be the same as or lower than the transmission power designated by the international SAR standard (specification) such that the electronic device of a phone type may transmit a signal while an external object does not contact the electronic device. Meanwhile, when a grip is detected in the identification result of operation 501, the processor, in operation 505, may control a wireless communication circuit such that a wireless signal is transmitted with a (1-2) transmission power. The (1-2)-th transmission power is electric power set to be transmitted when a human body approaches the electronic device, and may be the (1-1)-th transmission power or less.

Meanwhile, when the type of the electronic device is a phablet type in the identification result of operation 403, the processor, in operation 511, may identify whether a grip is detected. For example, the processor may identify whether an external object (e.g., a human body) contacts (or is located within a predetermined distance from) a partial area of the electronic device. When a grip is not detected in the identification result of operation 511, the processor, in operation 513, may control a wireless communication circuit such that a wireless signal is transmitted with a (2-1)-th transmission power. The (2-1)-th transmission power may be the same as or lower than the transmission power designated by the international SAR standard (specification) such that the electronic device of a phablet type may transmit a signal while an external object does not contact the electronic device. Meanwhile, when a grip is detected in the identification result of operation 511, the processor, in operation 515, may control a wireless communication circuit such that a wireless signal is transmitted with a (2-2)-th transmission power. The (2-2)-th transmission power is electric power set to be transmitted when a human body approaches the electronic device, and may be the (2-1)-th transmission power or less.

Meanwhile, when the type of the electronic device is a tablet type in the identification result of operation 403, the processor, in operation 531, may identify whether a grip is detected. For example, the processor may identify whether an external object (e.g., a human body) contacts (or is located within a predetermined distance from) a partial area of the electronic device. When a grip is not detected in the identification result of operation 531, the processor, in operation 533, may control a wireless communication circuit such that a wireless signal is transmitted with a (3-1)-th transmission power. The (3-1)-th transmission power may be the same as or lower than the transmission power designated by the international SAR standard (specification) such that the electronic device of a tablet type may transmit a signal while an external object does not contact the electronic device. Meanwhile, when a grip is detected in the identification result of operation 531, the processor, in operation 535, may control a wireless communication circuit such that a wireless signal is transmitted with a (3-2)-th transmission power. The (3-2)-th transmission power is electric power set to be transmitted when a human body approaches the electronic device, and may be the (3-1)-th transmission power or less.

Meanwhile, when the type of the electronic device is a laptop type in the identification result of operation 403, the processor, in operation 551, may identify whether a grip is detected. For example, the processor may identify whether an external object (e.g., a human body) contacts (or is located within a predetermined distance from) a partial area of the electronic device. When a grip is not detected in the identification result of operation 551, the processor, in operation 553, may control a wireless communication circuit such that a wireless signal is transmitted with a (4-1)-th transmission power. The (4-1)-th transmission power may be the same as or lower than the transmission power designated by the international SAR standard (specification) such that the electronic device of a laptop type may transmit a signal while an external object does not contact the electronic device. Meanwhile, when a grip is detected in the identification result of operation 551, the processor, in operation 555, may control a wireless communication circuit such that a wireless signal is transmitted with a (4-2)-th transmission power. The (4-2)-th transmission power is electric power set to be transmitted when a human body approaches the electronic device, and may be the (4-1)-th transmission power or less.

Figure 6:
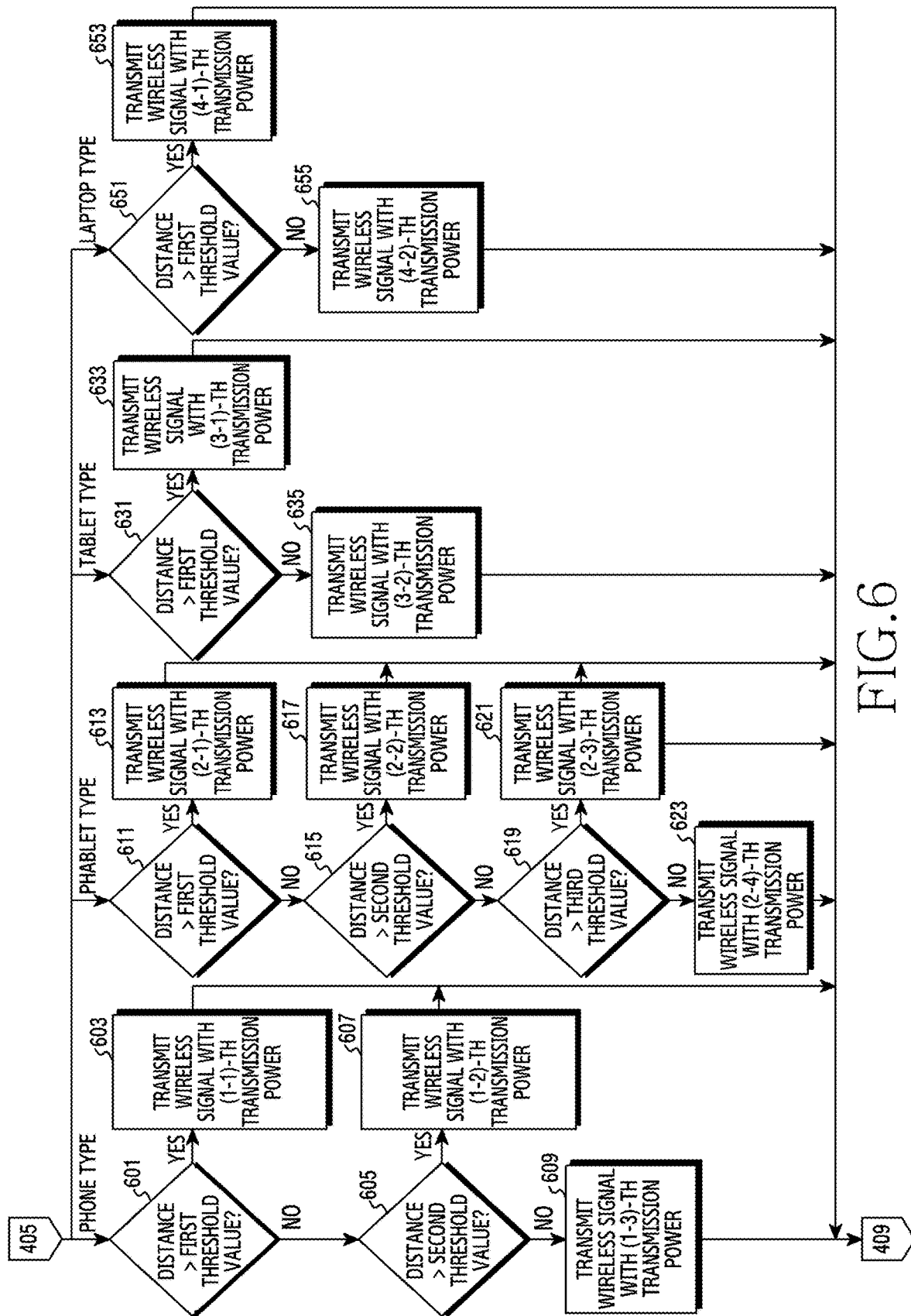
FIG. 6 illustrates a flowchart of a method for controlling transmission power of an electronic device according to an approach distance according to an embodiment of the disclosure.

FIG. 6 illustrates a flowchart of a method for controlling transmission power of an electronic device according to an approach distance according to an embodiment of the disclosure.

Referring to FIG. 6, when the type of the electronic device is a phone type in the identification result of operation 403, the processor (e.g., the processor 120 and the processor 320), in operation 601, may identify whether the distance detected in operation 405 is more than (or not less than) a first threshold value (e.g., 15 mm). When the distance is more than the first threshold value in the identification result of operation 601, the processor, in operation 603, may control a wireless communication circuit such that a wireless signal is transmitted with a (1-1)-th transmission power.

Meanwhile, when the distance is not more than the first threshold value in the identification result of operation 601, the processor, in operation 605, may identify whether the detected distance is more than (or not less than) a second threshold value (e.g., 10 mm). When the distance is more than the second threshold value in the identification result of operation 605, the processor, in operation 607, may control a wireless communication circuit such that a wireless signal is transmitted with a (1-2)-th transmission power. The (1-2)-th transmission power may be not more than the (1-1)-th transmission power.

Meanwhile, when the distance is not more than the second threshold value in the identification result of operation 605, the processor, in operation 609, may control a wireless communication circuit such that a wireless signal is transmitted with a (1-3)-th transmission power. The (1-3)-th transmission power may be not more than the (1-2)-th transmission power.

Meanwhile, when the type of the electronic device is a phablet type in the identification result of operation 403, the processor, in operation 611, may identify whether the detected distance is more than (or not less than) the first threshold value (e.g., 15 mm). When the distance is more than the first threshold value in the identification result of operation 611, the processor, in operation 613, may control a wireless communication circuit such that a wireless signal is transmitted with a (2-1)-th transmission power.

Meanwhile, when the distance is not more than the first threshold value in the identification result of operation 611, the processor, in operation 615, may identify whether the detected distance is more than (or not less than) a second threshold value (e.g., 10 mm). When the distance is more than the second threshold value in the identification result of operation 615, the processor, in operation 617, may control a wireless communication circuit such that a wireless signal is transmitted with a (2-2)-th transmission power. The (2-2)-th transmission power may be not more than the (2-1)-th transmission power.

Meanwhile, when the distance is not more than the second threshold value in the identification result of operation 615, the processor, in operation 619, may identify whether the detected distance is more than a third threshold value (e.g., 0 mm). When the distance is more than the third threshold value in the identification result of operation 619, the processor, in operation 621, may control a wireless communication circuit such that a wireless signal is transmitted with a (2-3)-th transmission power. The (2-3)-th transmission power may be not more than the (2-2)-th transmission power.

Meanwhile, when the distance is not more than the third threshold value in the identification result of operation 619, the processor, in operation 623, may control a wireless communication circuit such that a wireless signal is transmitted with a (2-4)-th transmission power. The (2-4)-th transmission power may be not more than the (2-3)-th transmission power.

Meanwhile, when the type of the electronic device is a tablet type in the identification result of operation 403, the processor, in operation 631, may identify whether the detected distance is more than the first threshold value (e.g., 0 mm). When the distance is more than the first threshold value in the identification result of operation 631, the processor, in operation 633, may control a wireless communication circuit such that a wireless signal is transmitted with a (3-1) transmission power. Meanwhile, when the distance is not more than the first threshold value in the identification result of operation 631, the processor, in operation 635, may control a wireless communication circuit such that a wireless signal is transmitted with a (3-2)-th transmission power. The (3-2)-th transmission power may be not more than the (3-1)-th transmission power.

When the type of the electronic device is a laptop type in the identification result of operation 403, the processor, in operation 651, may identify whether the detected distance is more than the first threshold value (e.g., 0 mm). When the distance is more than the first threshold value in the identification result of operation 651, the processor, in operation 653, may control a wireless communication circuit such that a wireless signal is transmitted with a (4-1) transmission power. Meanwhile, when the distance is not more than the first threshold value in the identification result of operation 651, the processor, in operation 655, may control a wireless communication circuit such that a wireless signal is transmitted with a (4-2)-th transmission power. The (4-2)-th transmission power may be not more than the (4-1)-th transmission power.

According to various example embodiments of the disclosure, a method for controlling transmission power of an electronic device (e.g., the electronic device 101, the foldable electronic device 201, the rollable electronic device 205) may comprise: determining an effective size of an exposed area of a flexible display (e.g., the display device 160, the flexible display 260, the flexible display 360) of the electronic device; determining a type of the electronic device based at least in part on the determined effective size; detecting a distance between the electronic device and an external object; and controlling transmission power of a wireless communication circuit (e.g., the wireless communication module 192, the wireless communication module 350) of the electronic device based at least in part on the determined type of the electronic device and the detected distance.

According to various example embodiments, the determining of the effective size may comprise: measuring an angle of a foldable housing (e.g., the foldable housing 210) by using at least one sensor (e.g., the sensor module 176, the type detecting module 310); or identifying an unfolding degree of the flexible display by using the at least one sensor.

According to various example embodiments, the measuring of the angle of the foldable housing may comprise at least one of: measuring the angle of the foldable housing by using an angle sensor connected to a hinge structure (e.g., the hinge structure 213) that connects a first housing structure (e.g., the first housing structure 211) and a second housing structure (e.g., the second housing structure 212) of the foldable housing; or measuring the angle of the foldable housing by using a first motion sensor disposed inside the first housing structure and a second motion sensor disposed inside the second housing structure.

According to various example embodiments, the controlling of the transmission power of the wireless communication circuit may comprise: selecting at least one of a plurality of parameters stored for controlling the transmission power based at least in part on the determined type of the electronic device and the detected distance.

According to various example embodiments, the controlling of the transmission power of the wireless communication circuit may comprise: selecting a power parameter corresponding to the determined type of the electronic device and the detected distance from a lookup table that maps the transmission power with the type of the electronic device and the distance; and controlling the wireless communication circuit to transmit a wireless signal as the transmission power corresponding the selected power parameter.

According to various example embodiments, the determining of the type of the electronic device may comprise: determining any one of a phone type, a phablet type, a mini-tablet type, a tablet type, or a laptop type defined by an international specific absorption rate (SAR) standard as the type of the electronic device.

According to various example embodiments, the detecting of the distance between the electronic device and an external object may comprise: identifying whether the distance between the electronic device and the external object is within at least one threshold value.

According to various example embodiments, the number of the at least one threshold value may be varied according to the type of the electronic device.

According to various embodiments of the disclosure, transmission power can be adaptively controlled such that the electronic wave rule (e.g., the human body electromagnetic wave absorption rate rule) corresponding to a type (or a form-factor) of an electronic device according to a change in the size of a display can be controlled. Further, according to various embodiments of the disclosure, the electromagnetic wave rule (e.g., the human body electromagnetic wave absorption rate rule) according to an approach distance between the electronic device and an external object (e.g., the human body) can be satisfied.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic devices 101). For example, a processor (e.g., the processor 120) of the machine (e.g., the electronic devices 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for controlling transmission power of an electronic device, the method comprising:
    measuring an angle of a foldable housing of the electronic device using an angle sensor connected to a hinge structure connecting between a first housing structure and a second housing structure of the foldable housing;
    determining a type of the electronic device corresponding to a range in which the measured angle is included;
    determining whether the electronic device is gripped by a human body based on change in a capacitance with a distance between the electronic device and the human body; and
    in response to determining that the electronic device is gripped by the human body, adjusting transmission power of a wireless communication circuit of the electronic device based at least in part on the determined type of the electronic device,
    wherein adjusting the transmission power of the wireless communication circuit comprises:
        selecting a power parameter corresponding to the determined type of the electronic device and a detected distance from a lookup table that maps the transmission power with the type of the electronic device and a distance; and
        transmitting, by the wireless communication circuit, a wireless signal as the transmission power corresponding the selected power parameter.

2. The method of claim 1, wherein measuring the angle of the foldable housing further comprises:
    measuring the angle of the foldable housing using a first motion sensor disposed inside the first housing structure and a second motion sensor disposed inside the second housing structure.

3. The method of claim 1, wherein determining the type of the electronic device comprises determining one of a phone type, a phablet type, a mini-tablet type, a tablet type, or a laptop type identified by an international specific absorption rate (SAR) standard as the type of the electronic device.

* * * * *